2,860,133
Patented Nov. 11, 1958

2,860,133

PROCESS OF REDUCING 3-ENOL SAPOGENIN ACYLATES WITH SODIUM BOROHYDRIDE

George Rosenkranz, Mexico City, Mexico, and Carl Djerassi, Detroit, Mich., assignors to Syntex S. A., Mexico City, Mexico, a corporation of Mexico No Drawing. Application March 20, 1952
Serial No. 277,715

Claims priority, application Mexico August 2, 1951

7 Claims. (Cl. 260—239.55)

The present invention relates to a method for the production of cyclopentanophenanthrene compounds.

More particularly the present invention relates to a new method for the reduction of enol sapogenin acylates, i. e. $\Delta^{3,5,7}$ or $\Delta^{3,5,7,9(11)}$-3-ol esters to the corresponding $\Delta^{5,7}$, or $\Delta^{5,7,9(11)}$ compounds. The process of the present invention provides an economical method for the production of $\Delta^{5,7}$ and $\Delta^{5,7,9(11)}$ compounds which are valuable intermediates in the introduction of 11-oxy groups in the steroid molecule. As is well known, 11-oxy groupings are at the present time believed to be an essential characteristic of valuable therapeutics such as cortisone and compound F.

In United States application Serial No. 219,531, now abandoned, filed April 5, 1951, there is disclosed a method for the production of certain $\Delta^{3,5,7}$ and $\Delta^{3,5,7,9(11)}$ compounds which may be characterized by the following formulas:

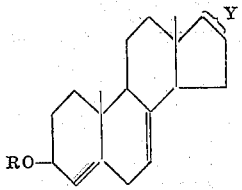

or

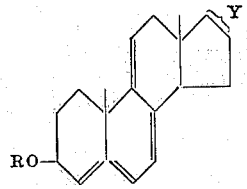

wherein R may be an esterification residue of a lower fatty acid such as acetic or propionic and Y may be either of the following groups characteristic of the sapogenins:

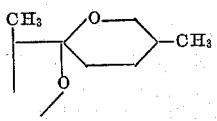

or

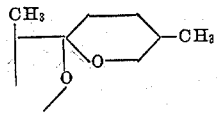

In accordance with the present invention it has now been discovered that compounds of the aforementioned type can be readily reduced with sodium borohydride to the corresponding $\Delta^{5,7}$ or $\Delta^{5,7,9(11)}$ compounds in good yield and without effecting the side chain as exemplified by the following equations:

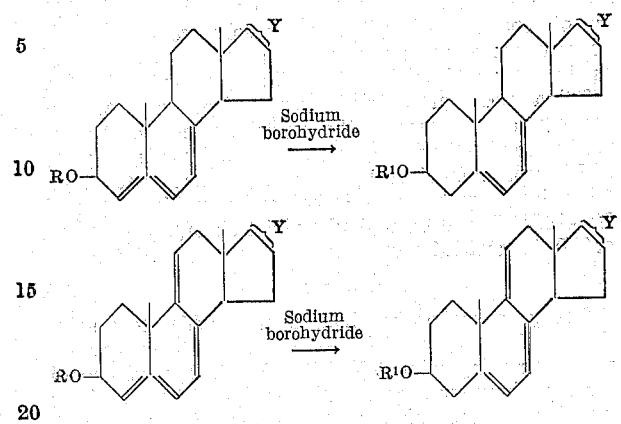

In the above equations R and Y indicate the same radicals as heretofore mentioned and $R^1$ may be hydrogen or the esterification residue of a lower fatty acid such as acetic or propionic.

In practicing the process of the present invention the starting compounds such as, for example, 3-acetoxy-$\Delta^{3,5,7}$-22-isospirostatriene or 3-acetoxy-$\Delta^{3,5,7,9(11)}$-22-isospirostatetraene are dissolved in a suitable organic solvent such as a lower alcohol, for example, ethyl alcohol, or mixtures of dioxane and a lower alcohol, i. e. ethyl or methyl alcohol. The sodium borohydride may then be added thereto. Prior to adding the sodium borohydride to the solution of the starting compounds, the sodium borohydride may be dissolved in a suitable solvent, as for example, a lower alcohol solvent, such as methanol, together with a small quantity of water. The reaction may be carried out by allowing the solution containing the sodium borohydride and the starting compound to remain at room temperature for a relatively long period of time, as for example, forty-eight hours. Thereafter the solution may be concentrated in vacuum, taken up in a suitable solvent, such as ether, and washed with, for example, a dilute sodium hydroxide solution and water, dried and evaporated to dryness. A crystalline residue consisting of, in the case of the 3-acetoxy $\Delta^{3,5,7}$-22-isospirostatriene, of $\Delta^{5,7}$-22-isospirostadiene-3β-ol, is produced. This residue may be further purified, as by recrystallization, from a suitable solvent, such as ethyl acetate, to give the pure compound; or, in the alternative, the crystalline residue may be directly acetylated without further purification, as for example, with pyridine and acetic anhydride to form the corresponding acetate. Instead of using room temperature for the reaction, higher temperatures may be utilized, as for example, the refluxed temperature of the solvent used, i. e. temperatures of the order of 80° C. These higher temperatures are especially desirable in the case of the tetraene compound previously mentioned. In the case of the triene compound lower temperatures than room temperatures may be desirably used. Thus, the solution of 3-acetoxy $\Delta^{3,5,7}$-22-isospirostatriene may be cooled with ice and added in an ice-cold condition to a solution of sodium borohydride. Thereafter the reaction may occur by allowing the reaction solution to stand at 10° C. for approximately one day and completed by heating the mixture on a steam bath for a short period, as for example thirty minutes. Instead of the direct acetylation of the crystalline material or product, the product, as previously set forth, may be purified and the crystalline mother liquors may be then directly acetylated in order to produce a further yield of a lower fatty acid ester, The following specific examples serve to illustrate the present invention but are not intended to limit the same:

Example I 0.5 g. of sodium borohydride were added at room temperature to a solution of 1.5 g. of $\Delta^{3,5,7}$-22-isospirostatriene-3-ol acetate (melting point 191–193° C.) in 500 cc. of ethanol. After leaving the solution 48 hours at room temperature, it was concentrated in vacuum, taken up in ether and washed with dilute sodium hydroxide solution and water, dried over sodium sulphate and evaporated to dryness. The crystalline residue was directly acetylated with pyridine-acetic anhydride to yield $\Delta^{5,7}$-22-isospirostadiene-3$\beta$-ol acetate, which, after crystallization from benzene-alcohol had a melting point of 201–205° C. and showed ultraviolet absorption maxima at 270, 280 and 292 mu.

Example II 0.16 g. of sodium borohydride were added to a solution of 0.47 g. of $\Delta^{3,5,7,9(11)}$-22-isospirostatetraene-3-ol acetate (melting point 175–176° C.) in 200 cc. of alcohol and the mixture was left standing during 48 hours. After working up the mixture as described in Example I, $\Delta^{5,7,9(11)}$-22-isospirostatriene-3$\beta$-ol-acetate was obtained with a melting point of 177–179° C., ultraviolet absorption maxima at 310, 324 and 338 mu.

Example III

An ice cold mixture of 1.0 g. of 3-acetoxy-$\Delta^{3,5,7}$-22-isospirostatriene in 40 cc. of dioxane and 60 cc. of methanol was added in one portion to a solution of 1.6 g. of sodium borohydride in 40 cc. of methanol and 33 cc. of water. After standing at 10° for 16 hours, the mixture was warmed for 30 minutes on the steambath, diluted with water and the solid was collected; yield, 0.94 g.

$\lambda_{max.}^{EtOH}$ 270, 282 and 292 mu, log E 4.07, 4.09, 3.86

Two recrystallizations from ethyl acetate furnished 0.55 g. (60%) of $\Delta^{5,7}$-22-isospirostadien-3$\beta$-ol with a melting point of 187–190° C. $(\alpha)_D^{20}$—177°

$\lambda_{max.}^{EtOH}$ 270, 280 and 292 mu, log E 4.17, 4.19, 3.99 infrared spectrum identical with that of an authentic specimen.

Acetylation of the crystalline mother liquors afforded an additional 10–13% of $\Delta^{5,7}$-22-isospirostadien-3$\beta$-ol acetate with a melting point of 201–203° C.

$(\alpha)_D^{20}$—122° the identity of which was confirmed by comparison of its infrared spectrum with that of an authentic sample.

On carrying out the reaction as above but refluxing for 2 hours, the crude product (85% yield) exhibited a melting point of 160–170° C., $(\alpha)_D^{20}$—99°

$\lambda_{max.}^{EtOH}$ 242, 270, 280 and 292 mu, log E 3.52, 3.87, 3.89, 3.67

Example IV

One gram of 3-acetoxy-$\Delta^{3,5,7,9(11)}$-22-isospirostatetraene upon treatment with sodium borohydride as described in Example III (10°) produced 0.635 g. (69%) of $\Delta^{5,7,9(11)}$-22-isospirostatriene-3$\beta$-ol with a melting point of 187–190° C., $(\alpha)_D^{20}$+121°

$\lambda_{max.}^{EtOH}$ 324 mu, log E 4.14 and inflections at 312 mu (log E 4.10) and 338 mu (log E 4.00).

The acetate prepared by conventional acetylation showed a melting point of 178–179° C., $(\alpha)_D^{20}$+173°. The infrared spectra of both compounds were identical with those of authentic derivatives.

In this instance, the reduction could be carried out at 80° C. without any diminution in yield, which in addition to a shorter reaction time had the advantage that it was possible to work in more concentrated solution. Thus, when 0.8 g. of 3-acetoxy-$\Delta^{3,5,7,9(11)}$-22-isospirostatetraene was refluxed for two hours with 1.6 g. of sodium borohydride in 30 cc. each of dioxane and ethanol containing 3 cc. of water, precipitation with water afforded 0.71 g. (97%) of crude $\Delta^{5,7,9(11)}$-trien-3$\beta$-ol with a melting point of 173–178° C., $(\alpha)_D^{20}$+113°

$\lambda_{max.}^{EtOH}$ 324 mu, log E 4.11

One recrystallization from methanol led to 0.5 g. (68%) of the pure trienol.

We claim:

1. A process for the production of compounds selected from the group consisting respectively of $\Delta^{5,7}$-spirostadiene-3$\beta$-ol and $\Delta^{5,7,9(11)}$-spirostatriene-3$\beta$-ol having the following formula:

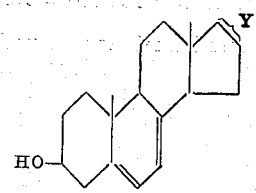

and

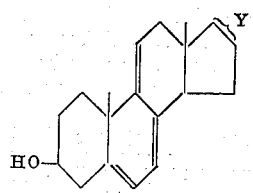

wherein Y is selected from the group consisting of radicals of the following formula:

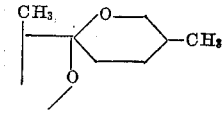

and

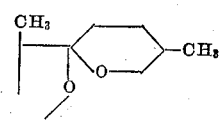

which comprises reducing the corresponding lower fatty acid esters of a compound selected from a group consisting respectively of $\Delta^{3,5,7}$-spirostatriene-3$\beta$-ol and $\Delta^{3,5,7,9(11)}$-spirostatetraene-3$\beta$-ol with sodium borohydride.

2. A process for the production of compounds selected from the group consisting respectively of lower fatty acid esters of $\Delta^{5,7}$-spirostadiene-3$\beta$-ol and lower fatty acid esters of $\Delta^{5,7,9(11)}$-spirostatriene-3$\beta$-ol having the following formula:

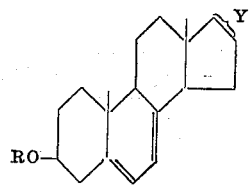

and

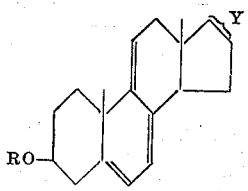

wherein R represents a lower fatty acid acyl group and wherein Y is selected from the group consisting of radicals of the following formula:

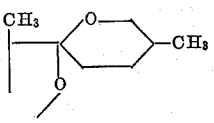

and

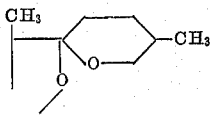

which comprises reducing the corresponding lower fatty acid ester of a compound selected from the group consisting respectively of $\Delta^{3,5,7}$-spirostatriene-3β-ol and $\Delta^{3,5,7,9(11)}$-spirostatetraene-3β-ol with sodium borohydride and thereafter acylating.

3. A process for the production of compounds selected from the group consisting respectively of $\Delta^{5,7}$-22-isospirostadiene-3β-ol and $\Delta^{5,7,9(11)}$-22-isospirostatriene-3β-ol having the following formula:

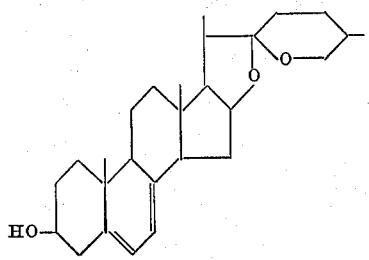

and

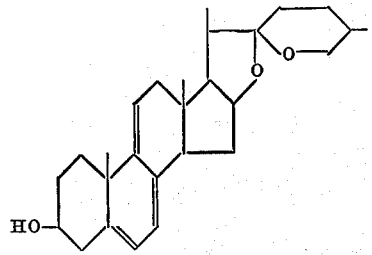

which comprises reducing the corresponding lower fatty acid esters of a compound selected from a group consisting respectively of $\Delta^{3,5,7}$-22-isospirostatriene-3β-ol and $\Delta^{3,5,7,9(11)}$-22-isospirostatetraene-3β-ol with sodium borohydride.

4. A process for the production of compounds selected from the group consisting respectively of lower fatty acid esters of $\Delta^{5,7}$-22-isospirostadiene-3β-ol and lower fatty acid esters of $\Delta^{5,7,9(11)}$-22-isospirostatriene-3β-ol having the following formula:

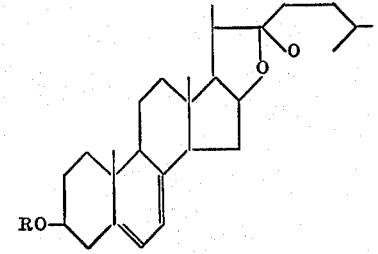

and

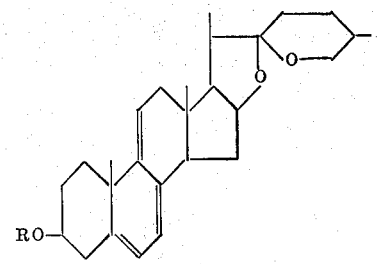

wherein R represents a lower fatty acyl group which comprises reducing the corresponding lower fatty acid esters of a compound selected from the group consisting respectively of $\Delta^{3,5,7}$-22-isospirostatriene-3β-ol and $\Delta^{3,5,7,9(11)}$-spirostatetraene-3β-ol with sodium borohydride and thereafter acylating.

5. A process for the production of $\Delta^{5,7}$-22-isospirostadiene-3β-ol having the formula:

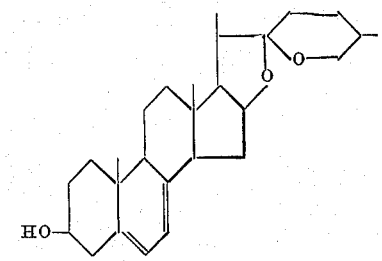

which comprises reducing 3-acetoxy-$\Delta^{3,5,7}$-22-isospirostatriene with sodium borohydride.

6. A process for the production of $\Delta^{5,7,9(11)}$-22-isospirostatriene-3β-ol having the following formula:

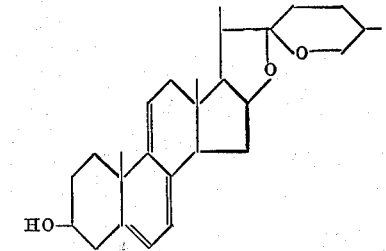

which comprises reducing 3-acetoxy-$\Delta^{3,5,7,9(11)}$-22-isospirostatetraene with sodium borohydride.

7. A process for the production of $\Delta^{5,7,9(11)}$-22-isospirostatriene-3β-ol having the following formula:

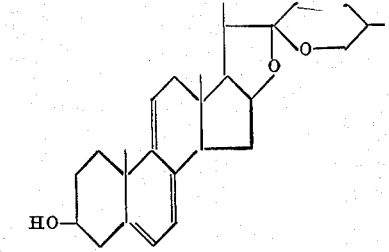

which comprises dissolving a lower fatty acid ester of $\Delta^{3,5,7,9(11)}$-22-isospirostatetraene in a lower alcohol solvent and refluxing with sodium borohydride.

No references cited.

UNITED STATES PATENT OFFICE
Certificate of Correction

Patent No. 2,860,133

November 11, 1958

George Rosenkranz et al.

It is hereby certified that error appears in the printed specification of the above numbered patent requiring correction and that the said Letters Patent should read as corrected below.

Column 1, lines 32 to 50, the formulas should appear as shown below instead of as in the patent—

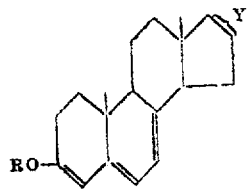

or

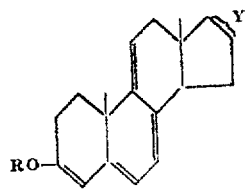

column 2, lines 2 to 22, the formula should appear as shown below instead of as in the patent—

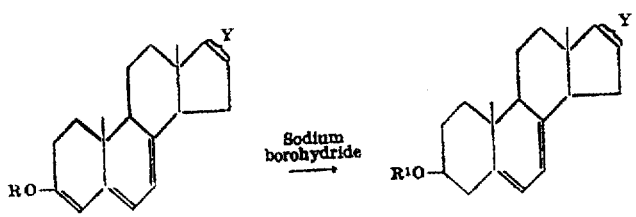

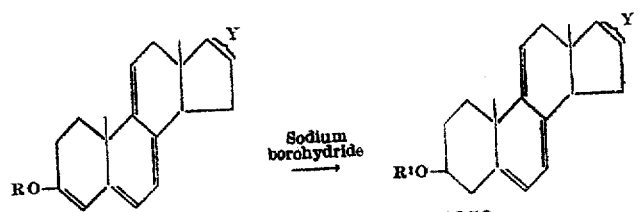

Signed and sealed this 24th day of February 1959.

[SEAL]

Attest:
KARL H. AXLINE,
Attesting Officer.

ROBERT C. WATSON,
Commissioner of Patents.